June 16, 1942.  A. RONNING  2,286,575
MOTORCYCLE
Filed March 2, 1939   2 Sheets-Sheet 1
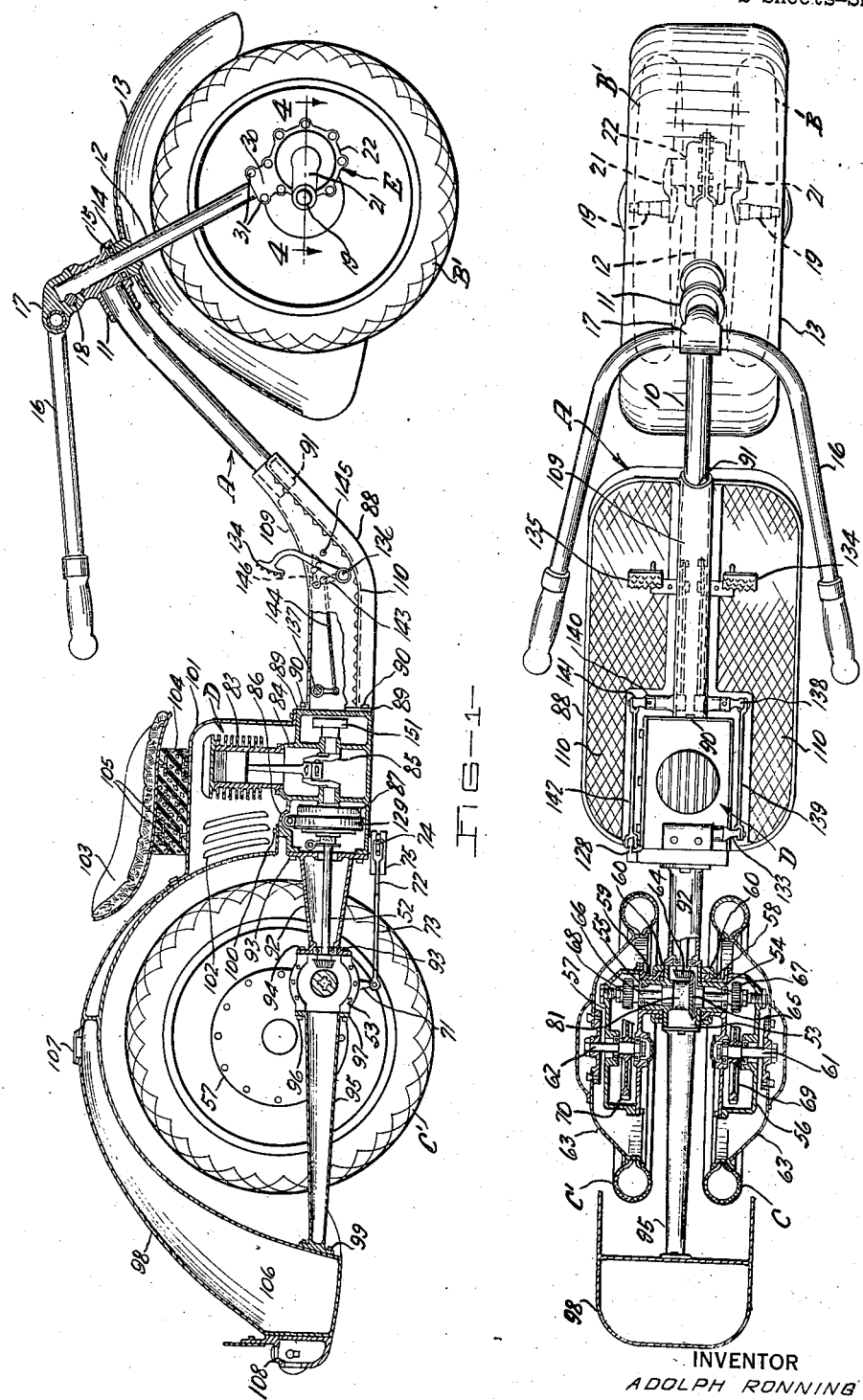
INVENTOR
ADOLPH RONNING
BY Carlsen & Hazle
ATTORNEYS June 16, 1942.  A. RONNING  2,286,575
MOTORCYCLE
Filed March 2, 1939   2 Sheets-Sheet 2
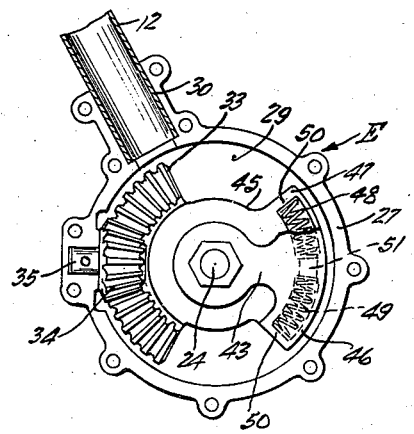
FIG-3-
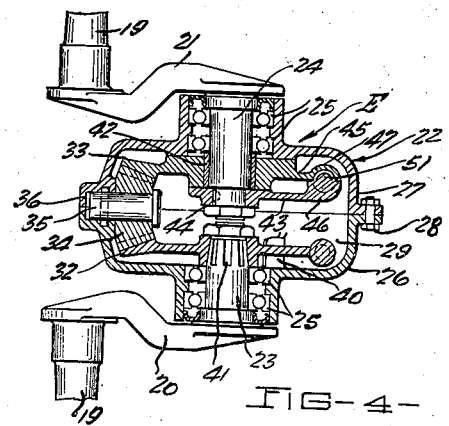
FIG-4-
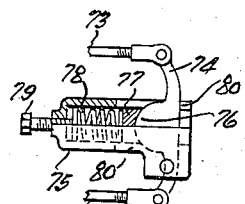
FIG-5-
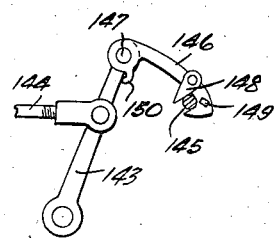
FIG-7-
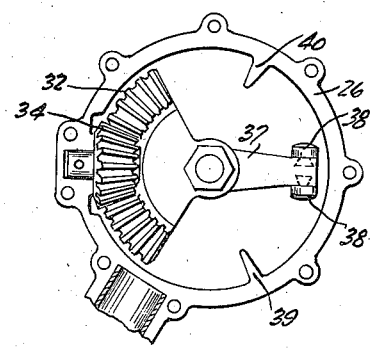
FIG-6-
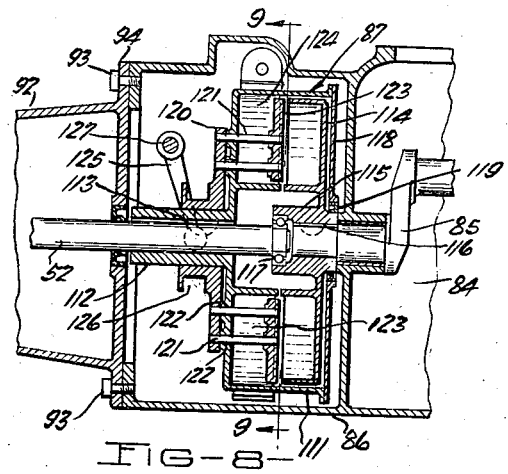
FIG-8-
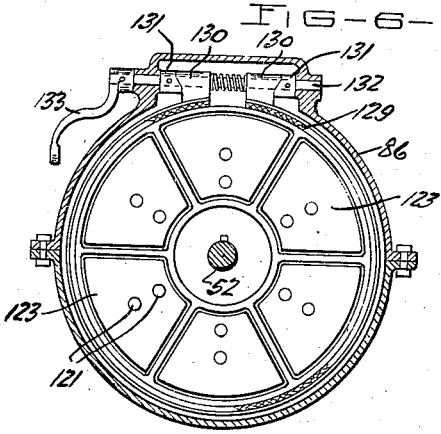
FIG-9-
INVENTOR
ADOLPH RONNING
BY Carlsen & Hagle
ATTORNEYS Patented June 16, 1942

2,286,575

UNITED STATES PATENT OFFICE 2,286,575

MOTORCYCLE

Adolph Ronning, Minneapolis, Minn.

Application March 2, 1939, Serial No. 259,361

17 Claims. (Cl. 180—73)

This invention relates to improvements in vehicles of the motorcycle type.

The ordinary motorcycle has numerous advantages over other types of motor vehicles, chief of which is its lightness, compactness and extreme maneuverability. However, there are offsetting disadvantages, particularly as regards lack of sufficient traction, tendency toward lateral skidding and rough riding characteristics over a rough terrain, which being well recognized, have somewhat limited use of this otherwise desirable vehicle.

The primary object of my invention therefore is to overcome the foregoing disadvantages by provision of a motorcycle having increased traction, better road gripping surface, and with adequate spring suspension for the wheels so that a safe, comfortable and efficient vehicle will be possible.

Another object is to provide a motorcycle which, contrary to usual practice, has four wheels arranged in closely spaced pairs at front and rear and with equalizing mechanism connecting the respective wheels of each front and rear pair in such manner that the effective traction and road gripping surfaces will be doubled, and comfort and safety increased while still permitting the machine to be tilted or "banked" to either side by the driver in the usual manner.

A further object is to provide an improved driving, equalizing and spring suspension means for the closely spaced wheels and which may, if desired, include a differential mechanism between the driven wheels.

A still further object is to provide a generally improved motorcycle construction including novel and advantageous features of frame design, engine or motor construction and support, control mechanism, and other features which will appear hereinafter.

These and other more detailed and specific objects will be disclosed in the course of the following specification, reference being had to the accompanying drawings, in which—

Fig. 1 is a side view of the motorcycle of my invention, parts of the frame and drive mechanism being shown in longitudinal vertical section, and the front and rear wheels in the obverse side being removed to better disclose the construction.

Fig. 2 is a plan view, the rear wheels and drive mechanism being shown in horizontal cross section and the rear fender being removed except at a rear portion, also shown in section.

Fig. 3 is an enlarged, vertical sectional view through the lower portion of the front wheel supporting members, showing one half of the housing of the front wheel equalizing mechanism and associated parts.

Fig. 4 is an enlarged, horizontal section along the line 4—4 in Fig. 1, the front wheels being removed from their spindles.

Fig. 5 is a detail plan view, partially in section, of the equalizing mechanism for the rear wheels.

Fig. 6 is a view similar to Fig. 3, but looking at the opposite side portion of the housing.

Fig. 7 is an enlarged side elevation of the control pedal locking means.

Fig. 8 is an enlarged, vertical and longitudinal section through clutch and brake portions of the power plant for the motorcycle.

Fig. 9 is a cross section along the line 9—9 in Fig. 8.

Referring now with more particularity and by reference characters to the drawings, A designates generally the motorcycle frame, B—B' the front wheels and C—C' the rear wheels. The rear wheels are power driven by an engine or power plant designated generally at D.

The frame A consists essentially of a fore and aft assembly terminating forwardly in an upwardly inclined tubular member 10 secured to which is a coupling 11 through which the front wheel steering and supporting post 12 is journaled. This post 12, which may be either of tubular or solid construction, carries the front fender 13 and a block 14 supporting the fender is rigidly secured to the post to bear upwardly against a thrust bearing 15. The handle bars 16 are connected to the upper end of the steering post by a coupling 17 retained in place by a tapered pin 18 fitting tangentially across a notched portion of the post in the manner clearly shown in Fig. 1, and which may be drawn up tight by a nut (not shown) screwed on its exposed smaller end. By swinging the handle bars 16 the steering post may be oscillated about its upwardly and rearwardly inclined axis for steering purposes, as will be readily understood.

To the lower end of the steering post is affixed the equalizing mechanism, designated generally at E, and which forms the actual connection to the transversely and closely spaced front wheels B—B'. In the form here shown this mechanism E includes laterally and oppositely extended spindles 19 upon which the wheels are mounted, and which are extended from the rear ends of crank arms 20 and 21 disposed at opposite sides of a housing 22 and journaled at their frontal ends therein by coaxial stub shafts 23 and 24 operating in anti-friction bearings 25. This housing 22 comprises two complementary side portions 26 and 27 joined along a medial and vertical plane and secured together by bolts 28, and these side portions define and enclose a central chamber 29 as well as an upwardly and rearwardly inclined mounting neck 30. The neck 30 is slipped over the lower end of the steering post 12 and clamped thereon by bolts 31 in such position that the wheels B—B' carried by the crank arms 20 and 21 will be properly aligned for straightahead travel in the central position of the handle bars 16, as shown. The spindles 19 slope outwardly and laterally somewhat in order to give a proper camber to the front wheels B—B' as indicated in Fig. 2.

The inner ends of the stub shafts 23 and 24 are connected to bevel gear segments or sections 32 and 33, respectively, and these segments are operatively connected by an intermediate bevel gear pinion 34 which has its stub shaft 35 journaled in a bearing recess 36 formed in the housing 22.

It will be understood that the weight of the frontal end of the machine when imposed on the housing 22 will be transmitted through the crank arms 20 and 21 equally to the wheels B—B' and the parts will all remain relatively stationary when traveling over a smooth surface. However, the differential connection between respective parts on either side will allow either wheel to move vertically in one direction while the other adjusts itself vertically and equally in the opposite direction, and this action will of course occur as either wheel meets an uneven section of ground. The weight will meanwhile be evenly and constantly distributed and equalized between the wheels.

It may be noted at this point that the equalizing assembly thus far described is similar in construction and operation to that shown in my copending application for patent Serial No. 244,019, filed December 5, 1938, now Patent 2,208,601, issued July 23, 1940, for Steerable vehicle truck, and reference may be had to this application for comparative purposes.

There is of course a limit to the vertical adjustments of the parts, and to prevent undesirable shocks and jars when the parts reach their limit of movement, in travel over very rough ground, I provide one gear segment, as 32, with a radial extension 37 which carries oppositely disposed resilient bumpers or buffers 38 adapted to contact stop lugs 39 and 40 cast in the housing portion 26 at positions corresponding to the upper and lower extremes of movement of the segment extension.

To cushion the frame of the machine against road shocks I provide a spring suspension means now to be described. As shown in Fig. 4, one gear segment, the one 32 carrying the aforesaid buffer elements, is rigidly splined at 41 on its associated stub shaft 23. The other gear segment 33, however, is journaled freely at 42 on its stub shaft 24 and connection between the parts is provided by an arm member 43 which is keyed at 44 to the extreme inner end of the stub shaft and extends radially alongside an extension 45 of said segment. Outer arcuate portions 46—47 of these members 43—45, the curvature of which is determined and generated with the axis of the stub shafts as a center, are complementarily recessed to receive therebetween a pair of expansion coil springs 48 and 49 which are braced at their outer ends against end shoulders 50 of the recess in the member 45, and at their inner ends bear against a lug 51 carried by said arm member 43 and playing in said recess. By this assembly, rocking or oscillating motions transmitted by or to the stub shaft 24 are communicated to the gear segment 33 in the manner acquired for proper differential equalizing operation, but sudden shocks and jars incident thereto will be absorbed by the springs 48 and 49 to prevent them from reaching the frame of the machine. The overlapping configuration of the members 43—45 at their arcuate outer portions retain the springs in place therebetween while permitting complete, yieldably resisted, freedom of movement of the parts, as will be readily evident.

The trailing position of the crank arms 20 and 21, from their points of attachment to the housing 22 to their wheel supporting ends, together with the described inclination of the steering post 12, provides for proper and easy steering, and the steering action is further facilitated by the camber of the wheels and the fact that the wheels maintain this camber and their same relative positions as they adjust themselves to the ground over which they travel. At no time does there occur any lateral shifting of the wheels as they rise and fall such as would resist steering movement by frictional resistance on the ground.

The rear wheels C—C' are power driven from the engine D through the medium of a propeller shaft 52 extending rearwardly and entering a differential or gear housing 53 forming a part of the frame A. This housing 53 includes coaxial, oppositely and laterally extended, bearing necks 54 and 55, open at both inner and outer ends, and the wheels are carried by crank acting members 56 and 57 which take the form of housings having at their forward ends the inwardly turned bearing collars 58 and 59 by which they are pivotally mounted upon and over the aforesaid necks 54 and 55 to oscillate about the transverse axis of said necks. The flanged inner ends of the collars 58 and 59 are engaged by clamp rings 60 releasably secured or screwed on the housing 53 to prevent endwise or outward disengagement of the bearing parts.

At rearwardly spaced points (with respect to their connection with the gear housing 53) the members 56 and 57 carry the wheel mounting spindles 61 and 62 upon the outer ends of which the wheels C—C' are rigidly affixed. It will be noted that the disks 63 of the wheels are dished or convexed outwardly to provide inner concavities within which the supporting members 56 and 57 may be located and operated, to thus reduce the overall width of the assembly.

The rear end of the propeller shaft carries a bevel drive pinion 64 within the housing 53 which meshes with a bevel drive gear 65 carried upon and secured to a transversely extended drive shaft 66. This shaft 66 extends outwardly and coaxially through the bearing necks 54 and 55 and at its outer ends, within the frontal portions of the members 56 and 57, carries spur pinions 67 and 68. Large spur gears 69 and 70 carried on the wheel mounting spindle shafts 61 and 62 mesh with these pinions 67 and 68 and the drive is thus transmitted from the propeller shaft to the rear wheels.

The construction of the members 56 and 57 is such that all parts therein are fully enclosed and protected from dust and other foreign matter and all operating parts in these members and in the housing 53 may run in an oil bath for proper lubrication. Suitable anti-friction bearings are employed for the spindle shafts 61 and 62 and the shafts 52 and 66 and the housings are of course designed for proper casting and assembly, as clearly shown.

The collars 58 and 59 carry depended, radially extended and rigidly affixed equalizing arms 71 (only one of which is shown) and at their lower ends these arms are pivotally connected to forwardly extending equalizing rods 72 and 73 which, at their forward ends, are pivotally connected to a cross member or head 74. This member fits slidably into a tubular housing 75, secured beneath the frame forwardly of the rear wheel assembly, and has a rounded medial portion 76 having a fulcrum bearing upon a block 77 slidably mounted in housing 75. This block is braced against an expansion coil spring 78 in the housing and the forwardly directed tension of the spring may be adjusted by the screw 79. The ends of the cross member 74 play freely in diametrically opposed slots 80 in the frontal portion of the housing 75.

The foregoing arrangement is such that the weight of the rear portion of the machine is transmitted through the members 56 and 57 to the rear wheels C—C', and either wheel may adjust itself in a vertical plane in accordance with irregularities in the ground over which it travels. Such movement will, through the differential action of the rods 72 and 73, be transmitted and translated in an opposite direction to the other wheel, causing a constant equalization of weight upon the wheels. Road shocks will be absorbed by action of the spring 78 and prevented from reaching the frame.

This differential action of the wheels will have no effect on the transmission of power thereto since the drive pinions 67 and 68 operate on the same axis as that about which the differential upward and downward movement takes place. The drive gears may thus maintain driving and meshing engagement under all conditions. The connection between the propeller shaft 52 and the transverse drive shaft (or shafts) 66 may be direct through gears or through a differential gear mechanism, indicated at 81, as may be desired.

Several outstanding advantages in the foregoing construction, over the conventional two wheeled type of motorcycle, immediately present themselves. Chief of these is the fact that the effective traction and road engaging surfaces are doubled. This provides increased power and greatly reduces skidding tendencies. The differential equalizing action between front and rear pairs of wheels reduces vertical displacement as the machine travels over rough ground and, together with the spring shock absorption means, makes for a much more comfortable riding. This effect, however, is not obtained at the expense of maneuverability and the machine will be extremely flexible in operation. Due to the increased traction, resistance to skidding and comfortable travel over rough terrain the machine will be of particular advantage in ordinance work and similar rigorous uses, but it will be also of corresponding effectiveness in more commonplace fields.

The equalizing action between the wheels allows the machine to be tilted to either side by the driver in the usual manner of riding and manipulating such machines. The equalizing action thus is of extreme importance and is, in fact, the factor making possible the use of the four wheel suspension with resulting increase in traction and safety, and comfort in riding. During such tilting or "banking" action the frame and all wheels assume a leaning position from the vertical but the relative spacing between wheels remain the same, all wheels maintain constant contact with the ground, and the wheels may still additionally adjust themselves in vertical planes as they severally encounter irregularities in the surface over which they travel.

The frame assembly A and power plant D are also of novel and advantageous construction, as will now be described.

The power plant D may embody any conventional and effective type of engine or prime mover including an upper cylinder and piston assembly 83 and lower crankcase assembly 84 in which the power actuated crankshaft 85 may be located in horizontally and longitudinally extended position, and in which also is located a starter represented diagrammatically at 151. The crankcase is extended rearwardly in the form of a clutch and brake housing 86 in which a hydraulic impact clutch 87 is located for transmitting the drive from the crankshaft 85 to the propeller shaft 52.

Forwardly of the power unit is a pressed steel frame base member 88 which is secured at its flanged rear end 89 by screws 90 to the frontal end of the crankcase 84. The forward end of the base member 88 is turned upwardly and provided with a socket 91 for the reception of the lower rear extremity of the forward frame member 10 which is rigidly secured in said socket. Rearwardly of the power unit a tubular propeller shaft housing 92 is secured by screws 93 through its flanged front and rear ends 94 to the rear end of the crankcase and to the frontal end of the housing 53. A tail piece 95 is similarly secured by screws 96 through its flanged forward end 97 to the rear of this housing 53, and extends rearwardly between and beyond the rear wheels C—C'. The rear fender 98 is secured at its rear lower portion at 99 to the end of this tail piece 95 and extends forwardly and upwardly over the rear wheels to the upper portion of the power unit housing 86 where it is secured at 100.

An engine casing or hood 101 is secured to the frontal portion of the fender 98 and to the crankcase 84 to enclose and protect the engine and has an inlet opening or louvers 102. This casing forms a rest for the driver's seat 103 which is supported atop the casing upon a sponge rubber base 104 secured to both seat and casing by bolts 105 vulcanized in the base.

The rear fender is hollow or chambered as indicated at 106 to serve as a fuel tank and has the removable filler cap 107. Lighting equipment and license may also be carried on the tail of the fender as indicated at 108.

The foregoing frame construction is simple, inexpensive and extremely rigid as will be apparent. The lower parts of the power plant are incorporated as integral parts of the frame, thus further simplifying the construction and lowering the center of gravity to add to the safety and maneuverability of the machine. The center of gravity (longitudinally) is further lowered by virtue of the fact that the driving parts, including the propeller shaft and drive means therefor, are all located well below the axes of the wheels as shown best in Fig. 1.

The frame base member 88 includes a rigidly ribbed central portion 109 and the laterally and horizontally turned foot boards 110, the surfaces of which are roughened for safety purposes, as clearly shown. These foot boards furthermore extend rearwardly along the sides of the power unit in order to provide adequate protection and resting space for the feet of the driver. The forwardly and upwardly turned ends of the foot boards serve as additional mudguards for the front wheels, as will be evident.

The clutch and brake mechanism 87 includes an outer drum 111 having a hub 112 at its rear end keyed at 113 to the forwardly extended end of the propeller shaft 52. The driven rotor member 114 is provided also with a hub 115 keyed at 116 to the rear end of the crankshaft 85 and has a pilot bearing 117 for said propeller shaft. Forwardly of this rotor the drum 111 is closed by the plate 118 with a running seal 119 around the hub 115 and the space within the drum may be filled with the hydraulic fluid. The slidable operating plate 120 carries pins 121 extended slidably through apertures 122 in the rear end of the drum and at their inner ends these pins carry the segment-shaped plates 123 which operate within cell-like spaces 124 formed within the drum and rotor. The clutch operates upon the impact principle, and as the operating plate 120 is urged forwardly the clutch is engaged and vice versa. This operation is carried out by a fork 125 engaging a grooved portion 126 of the operating plate and supported upon a shaft 127 for swinging movement to adjust said plate forwardly and rearwardly. Outwardly of the housing 86 a lever 128 is secured to this shaft 127 for manipulating the fork.

A brake band 129 is placed around the periphery of the drum 111 and has lugs 130 at its parted ends with cam engagement with the actuating cam blocks 131 on the shaft 132 so that, as this shaft is rocked on its axis by the exteriorly arranged lever 133, the band will be contracted upon the drum for frictionally braking the same. This construction is clearly shown in Fig. 9.

Control of both the clutch and brake is by means of the two foot pedals 134 and 135 pivotally mounted at 136 on the frame member 109 in a convenient, forwardly located position. The brake pedal 134 actuates a countershaft 137 which in turn carries a lever 138 connected by a link 139 to lever 133 so that the brakes may be applied by pressing forwardly on the pedal. In similar manner the clutch pedal 135 actuates a countershaft 140 carrying a lever 141 connected by link 142 to the lever 128 so that forward motion of the pedal will move the clutch from engaged to disengaged position.

Both pedals 134 and 135 are provided with means for releasably locking them in depressed or operated condition. This is most clearly shown in Fig. 7, wherein the arm 143 is connected to either pedal to move forwardly therewith. This arm also serves as a part of the linkage 144 connecting each pedal to its associated countershaft 137 or 140. A cross pin 145 is rigidly supported in the frame member 109 in the path of a latch 146 on each of the arms 143 and so that the hooked end of the latch may ride up on the pin as either pedal is pushed forward and drop over the pin to lock the pedal in this position. During this action the latch pivots at 147 on the arm and at the same time a freely pivoted trigger 148 on each latch will drop behind the cross pin. To release the pedal it is pushed forwardly until the trigger drops ahead of the cross pin against the stop 149 on the hooked end of the latch, after which this trigger will cam the forward end of the latch upwardly and rearwardly over the cross pin as the pedal returns to neutral position. The brakes may then be set and the clutch disengaged when the machine is left standing, and the pedals may be readily returned to neutral position when desired. A stop 150 on each of the latches 146 prevents them from dropping out of proper alignment with the cross pin 145. Each pedal may be provided in any convenient manner with a spring (not shown) for returning it to normal position when the latch is released.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A motorcycle comprising a transversely tiltable manually balanced frame, front and rear pairs of independently rotatable wheels supporting the frame and tiltable therewith, and means producing differential vertical adjustments of the respective wheels of each front and rear pair as the motorcycle is tilted to either side.

2. A motorcycle comprising a transversely tiltable frame supported forwardly by a pair of transversely spaced, independently rotatable steerable front wheels, wheel means supporting the rear of the frame and tiltable with it, and differentially operating mechanism connected to the wheels of said pair and so constructed and arranged that the motorcycle may be tilted to a wide angle from the vertical toward either side while the wheels maintain uniform ground contact.

3. A motorcycle comprising a frame, a pair of transversely spaced, steerable front wheels, each rotatable independently of the other, a pair of transversely spaced rear wheels, a motor, driving connections from the motor to both of the rear wheels and differentially operating mechanism connected to the respective wheels of each front and rear pair and so constructed and arranged that the motorcycle frame and wheels may be tilted to an angle from the vertical toward either side while maintaining ground engagement of all of the wheels.

4. A four wheeled motorcycle, comprising a transversely tiltable frame, a pair of front wheels and a pair of rear wheels all independently rotatable while supporting the frame and tiltable therewith, the wheels of each front and rear pair being arranged in closely spaced transverse alignment, and differential means connecting the wheels and frame whereby the wheels on either side will move upwardly with respect to the frame while the wheels on the other side move relatively downwardly an equal amount, to thereby enable the motorcycle to be tilted to either side while maintaining both wheels of each pair in ground contact.

5. A wheeled vehicle of the transversely tiltable type balanced and guided by an operator thereon, comprising a frame, front and rear pairs of wheels supporting the frame, the wheels of each front and rear pair being normally transversely aligned and separately rotatable with respect to each other, and vertically adjustable differentially connected members supporting the frame upon the wheels and so constructed and arranged that the frame and wheels may be tilted transversely while the wheels adjust themselves vertically to equalize weight distribution and maintain constant ground engagement.

6. A motorcycle comprising a frame, front and rear pairs of independently rotatable wheels supporting the frame, equalizing mechanism operatively arranged between the wheels of each pair and connecting the said frame and wheels in a manner causing the wheels to vertically adjust themselves and maintain ground engagement as the motorcycle is tilted from side to side or travels over irregular ground surfaces, a motor mounted on the frame, and differential power transmission means connecting the motor to the wheels of one of said pairs.

7. A motorcycle comprising, a transversely tiltable frame, front and rear pairs of wheels supporting the frame, means supported by the wheels and differentially connected with the frame for vertically adjusting the wheels relative to each other as said frame is tilted to either side, a power unit carried by the frame, and drive connections between the power unit and one pair of wheels for differentially driving the wheels of said pair in all adjusted positions thereof.

8. A motorcycle comprising, a transversely tiltable frame, a pair of independently rotatable, transversely spaced, steerable front wheels, a pair of similarly spaced and power actuated rear wheels, differentially operating means connecting the wheels of each pair to the frame to produce equal and opposite vertical adjustments of the wheels of each pair relative to the frame and responsive to tilting and guiding movement of the frame, and means cushioning the frame with respect to one pair of said wheels.

9. In a motorcycle, a pair of transversely spaced steerable front wheels, and a similarly spaced pair of power actuated rear wheels, a frame extended between and supported by the wheels, vertically movable crank members supported by the wheels and oscillatably connected to the frame, and differential mechanism connecting the said crank members of each pair of wheels for translating upward movement of the wheels on one side of the frame into an equal but opposite movement of the wheels at the other side, the said mechanism being so constructed and arranged that the differential movement of the wheels may occur as the motorcycle is tilted to either side for balancing purposes, and in such manner that all wheels will maintain ground engagement during such tilting movement.

10. In a motorcycle, a pair of transversely spaced steerable front wheels, and a similarly spaced pair of power actuated rear wheels, a frame extended between the wheels, vertically movable crank members supported by the wheels and oscillatably connected to the frame, and differential mechanism connecting the said crank members of each pair of wheels for translating upward movement of the wheels on one side of the frame into an equal but opposite movement of the wheels at the other side, power actuated driving means for the rear wheels comprising gears secured to said wheels, and drive pinions meshing with said gears and operating on axes coinciding with the axis about which the said crank members of the rear wheels oscillate.

11. A four wheeled motorcycle comprising, a pair of closely spaced and transversely aligned steerable front wheels, a similar pair of rear traction wheels, a frame extended between the respective wheels of the front and rear pairs, crank members supported by the wheels and oscillatably connected with the frame for adjustment in vertical planes at their wheels supported ends and with respect to the frame, differentially operating mechanism connecting the crank members of each pair of wheels for translating movement of the wheels on either side of the frame to equal and opposite movement of the wheels on the other side, a power unit on the frame, rotating drive means actuated by said power unit and arranged for operation on axes coinciding with the axes about which the rear wheel supported cranks oscillate, and means connecting the rear wheels and said drive means for propelling the said wheels.

12. A four wheeled motorcycle comprising front and rear pairs of supporting wheels, the said wheels of each pair being transversely spaced, a frame comprising a forwardly located and rearwardly inclined steerable member extended between the front pair of wheels, the said frame also including a tail portion extended rearwardly between the rear wheels, differentially connected crank members supported by the front wheels and connected to the steerable member of the frame for oscillation at their wheel supported ends in central planes, crank members supported by the rear wheels and oscillatably connected to the tail portion of the frame for movement in vertical planes, and differentially operating connecting means extended between the rear wheel supporting crank members and the frame.

13. In a four wheeled motorcycle, a pair of front wheels and a pair of rear traction wheels arranged with the wheels of each pair in transversely spaced relation, a frame including a forwardly located steerable member extended between the front wheels and forwardly of the axes thereof, a differentially operating mechanism on the steerable member and including oppositely movable crank members arranged in trailing position and supported at their free ends by the wheels, the said frame also including a rear portion extended between the traction wheels and a transmission housing located in the rear portion forwardly of and below the axes of said traction wheels, differentially and oppositely movable crank acting members oscillatably connected with the transmission housing and supported at their rear ends by the traction wheels, and power actuated means in said housing for propelling the said traction wheels in any adjusted position thereof.

14. A motorcycle comprising a transversely tiltable frame disposed in a fore and aft extending vertical plane and adapted to be balanced by an operator mounted thereon, a wheeled steering unit supporting the front end of the frame and controlled by said operator, a pair of power driven wheels supporting the rear end of the frame one at each side of the frame and in parallelism with the said plane thereof, a motor connected to operate both of said wheels, and differentially acting means connecting the said driven wheels to the frame in a manner causing them to move in opposite vertical directions while maintaining them in parallelism with the plane of the frame.

15. A motorcycle comprising a transversely tiltable frame disposed in a fore and aft extending vertical plane and adapted to be balanced by an operator mounted thereon, a wheeled steering unit supporting the front end of the frame and controlled by said operator, a drive unit supporting the rear end of the frame and including at least one motor driven ground wheel, said steering unit including a mounting member steerable about a generally upright axis, a pair of ground wheels disposed at opposite sides of said axis, and differentially acting means connecting said ground wheels to said mounting member in a manner causing the ground wheels to move in opposite vertical directions, in response to ground irregularities and/or transverse tilting of the frame, while maintaining parallelism between the vertical planes of the wheels and the said axis.

16. In a motorcycle, a longitudinally extending transversely tiltable frame, powered traction means supporting the rear end of the frame, a pair of transversely spaced wheels for supporting the front end of the frame, a steering column mounted in the frame and extending down between the wheels of said pair, an operator's station on the frame, means disposed within reach of the operator on said station for oscillating the steering column, a mounting member secured to the steering column so as to be oscillated therewith, and differential acting means connecting the wheels to the mounting member in a manner causing the wheels to move in opposite directions parallel with the steering column when the frame is tilted.

17. In a motorcycle, a longitudinally extending transversely tiltable frame, powered traction means supporting the rear end of the frame, a pair of transversely spaced wheels for supporting the front end of the frame, a steering column mounted in the frame and extending down between the wheels of said pair, an operator's station on the frame, means disposed within reach of the operator on said station for oscillating the steering column, a mounting member secured to the steering column so as to be oscillated therewith, and differential acting means connecting the wheels to the mounting member in a manner causing the wheels to move in opposite directions parallel with the steering column when the frame is tilted, said differential acting means comprising a pair of cranks journaled in the mounting member and supported at their outer ends in the wheels, for movement in transversely spaced planes, and means connecting the cranks for translating a movement of one crank into a relatively opposite movement of the other crank.

ADOLPH RONNING.